United States Patent [19]

Strenglein

[11] 3,728,630
[45] Apr. 17, 1973

[54] WIDE BAND TRANSPONDER

[75] Inventor: Harry F. Strenglein, Clearwater, Fla.

[73] Assignee: Sperry Rand Corporation, New York, N.Y.

[22] Filed: Feb. 16, 1971

[21] Appl. No.: 115,508

[52] U.S. Cl. ................................. 325/8, 343/6.8 R
[51] Int. Cl. ........................... G01s 9/56, H04b 7/14
[58] Field of Search .................. 343/6.8 R, 6.8 LC, 343/18 B; 325/19, 8

[56] References Cited

UNITED STATES PATENTS 2,548,813  4/1951  Pericins et al. ............... 343/6.8 R
3,383,682  5/1968  Stephens, Jr. ...................... 343/8 X
2,561,421  7/1951  Seale et al. ................... 343/6.8 R
3,373,425  3/1968  Barischoff .................... 343/6.8 R
3,389,391  6/1968  Keeler et al. ................. 343/6.8 R Primary Examiner—Malcolm F. Hubler
Attorney—S. C. Yeaton

[57] ABSTRACT

A simple low-power transponder adapted for rescue purposes employs high frequency diode oscillator-detector devices each serving the dual role of receiver and transmitter in response to illumination by energy transmitted by a conventional search radar system.

11 Claims, 1 Drawing Figure

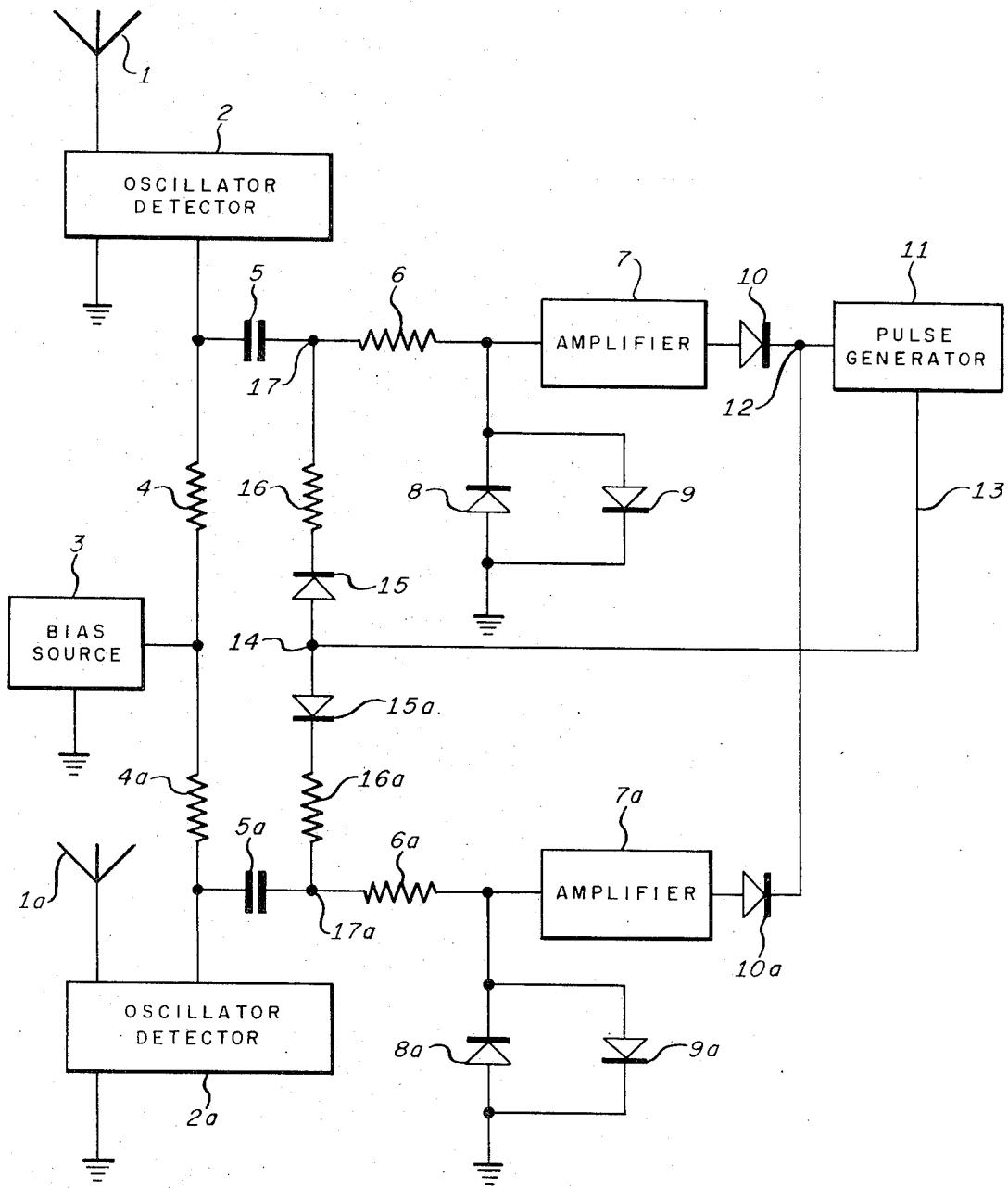

WIDE BAND TRANSPONDER

BACKGROUND OF THE INVENTION

1. Field of the Invention

The invention pertains to high frequency radar transponder devices for enhancing the responses of search radar systems and more particularly concerns a simple radar beacon or transponder apparatus requiring neither receiver nor transmitter tuning and adapted, for example, for use in distress, emergency, and rescue situations.

2. Description of the Prior Art

A considerable variety of beacon or radar transponder devices is known in the prior art of the kind which respond by transmitting a high frequency pulse lying in the receptivity band of a radar receiver when interrogated by a pulse transmitted by the cooperating transmitter of a radar system. Various prior requirements of operation have generally resulted in the production of radar transponders which are complex and have the inherent large size, weight, and initial and maintenance cost characteristics which are often inherent in complex designs. Such devices normally have special capabilities for generating pulsed high frequency transmissions that can be received by conventional radar receivers. Some utilize a harmonic generator cooperating with a receiver tuned to a harmonic of the expected radar carrier frequency. Others employ various types of mixer or frequency converter systems for regeneration of high frequency signals from the received radar signal. Still others use complex automatic frequency control systems for tuning elements of the transponder so that it transmits at the same carrier frequency as the interrogating radar transmitter. All have one or another feature unsuitable to use in emergency or rescue operations. These features include high cost, a complexity incompatible to the applications, high current drain, or a need for operation with a radar receiver different from that commonly used in search radar systems.

SUMMARY OF THE INVENTION

The present invention relates to high frequency transponder or radar beacon devices for greatly enhancing the echo returns of search radar systems in search and rescue operations. While the novel radio transponder has other applications, one which may be particularly mentioned is its use when airborne or surface radar systems are employed in an attempt to locate small craft in distress. For example, most small marine vessels, especially when constructed of wooden or fiber glass materials, are not particularly conspicuous targets readily identified in a search radar indicator against strong sea clutter. The problems connected with locating life boats or rafts and swimmers are increasingly difficult of solution. The invention employs low-power transponding elements in the form of high frequency diode oscillator-detector devices each serving a dual role as receiver and transmitter when interrogated by pulsed high frequency carrier energy transmitted by a conventional search radar system. The need for receiver tuning is eliminated by utilizing a broad band detector; the need for transmitter tuning is removed by transmitting a pulse having a very broad frequency spectrum. In the particular embodiment of the invention, spreading of the spectrum is accomplished by transmitting a short duration pulse which inherently has a broad spectrum. The oscillator-detector unit which is capable of transmitting very short pulses involves a resonant circuit having a low quality factor Q; this feature enables the device to work effectively also as a broad band detector. The invention provides means for greatly increasing the chances of location of small craft in adverse conditions.

BRIEF DESCRIPTION OF THE DRAWINGS

The sole FIGURE is an electrical wiring diagram illustrating the components of the invention and their interconnections.

DESCRIPTION OF THE PREFERRED EMBODIMENT

In the sole FIGURE, the wide band transponder is indicated for purposes of illustration as having two similar operating channels. It is to be understood that the invention may also be practiced using a plurality of channels greater than two, and that under certain practical circumstances, a single channel will be useful. Accordingly, a discussion of the structure and operation of a single channel of the transponder will first be presented. The representative channel to be discussed may include circuit elements 1 through 17.

Antenna 1 is preferably a conventional high frequency or microwave antenna of the omnidirectional type having a moderate degree of directivity in elevation. For example, when the invention is used as an emergency device when at sea, a rescue vessel having a radar unit suitable for excitation of the novel transponder system will generally have any random bearing with respect to a small vessel, raft, or other vehicle on which the emergency transponder may be located. An antenna capable of good response at substantially all azimuth angles is therefore desirable. Accordingly, a conventional monopole antenna may be employed or one may use other omnidirectional antennas such as the stub antenna, the top loaded stub antenna, the disc antenna, or the flush disc antenna.

Any pulsed high frequency carrier energy collected by antenna 1 is coupled into the quiescent single-port oscillator-detector 2, causing amplified oscillations to prevail within oscillator-detector 2 for a time period generally related to the amplitude and time duration of the received carrier pulse. It is to be understood that single-port oscillator-detector 2 may be any of several conventional known oscillator-detector devices or circuits, including an appropriately adjusted avalanche transit time high frequency diode oscillator of the type which is well known in the art to act as a detector when biased at a near-oscillating condition. The single-port device 2 operates in the invention both as a detector and as an oscillator. For example, when the oscillator's diode is biased near the point at which oscillations would commence, the added voltage across the oscillator diode, when a high frequency carrier is injected from antenna 1, produces growing oscillations because of conventional gain mechanisms inherent in the oscillator. These oscillations quickly decay when the input carrier signal ends. They can be measured or detected by observing the level of the diode bias current in the oscillating and non-oscillating conditions. Likewise, when the oscillator diode is biased still near the same point at which oscillations would commence, a slight elevation of the bias voltage will cause the circuit to break into high frequency oscillations. While conventional high frequency avalanche diode oscillators represent one form of negative resistance device suitable for dual mode operation as oscillators and detectors, other suitable devices are present in the prior art, including Gunn and tunnel diode oscillators and other similar amplifier or oscillator devices.

Since the particular form of the oscillator-detector device is not necessarily a part of the present invention, a discussion of details of its structure is not required for an understanding of the invention. However, single-tuned diode oscillator or amplifier devices suitable for use in the invention are described liberally in the literature and in the C. T. Rucker, J. W. Amos U.S. patent application Ser. No. 853,725, filed Aug. 28, 1969 for a "Microwave Negative Resistance Transducer" issued Sept. 14, 1971 as U.S. Pat. 3,605,034 and assigned to the Sperry Rand Corporation.

As seen in the sole FIGURE, diode oscillator detector 2 is supplied with a suitable diode biasing voltage through resistor 4 from a conventional bias signal source 3. By virtue of the presence of resistor 4, the bias level supplied to the diode of single-port oscillator-detector 2 is very nearly sufficient to cause oscillations to grow within oscillator-detector 2. The arrangement is such that the presence of received high frequency carrier energy collected by antenna 1 initiates such oscillations with the further consequence that there is an abrupt increase in current supplied by bias source 3 to the oscillator-detector 2 when oscillations begin. It is noted that the bias current path includes ground, bias source 3, resistor 4, the diode of device 2, and the return lead to ground.

A voltage corresponding to the instantaneous bias current appears across resistor 4 and any change in that bias current is coupled by capacitor 5 through current limiting resistor 6 to pulse amplifier 7. Capacitor 5 also prevents bias current flow into resistor 6. The junction between resistor 6 and pulse amplifier 7 is coupled to ground through a dual diode clipper circuit composed of oppositely poled diodes 8 and 9. Amplifier 7 thus produces a pulse output substantially when carrier energy is received by antenna 1 and the pulse output is supplied through diode 10 to a conventional pulse generator circuit 11. Pulse generator 11 may be a conventional single shot multibrator or other pulse generator which creates a pulse of duration, for example, of the order of 10 to 40 nano-seconds at sufficient amplitude to produce high power oscillations in oscillator-detector 2. Any pulse output developed by pulse generator 11 is coupled back by electrical conductor 13 to junction 14. Junction 14 cooperates with a series circuit connected between junction 14 and junction 17, which latter junction lies between coupling capacitor 5 and the current limiting resistor 6. The series circuit between junctions 14 and 17 consists of a diode 15 poled to conduct current flowing toward terminal 17 only, diode 15 being placed in series with a resistor 16.

In operation, an input carrier pulse transmitted, for example, by a search radar system in the operating vicinity of antenna 1 causes the quiescent single-port oscillator-detector device 2 to break into oscillation. Such operation causes device 2 to draw increased current through resistor 4 from bias source 3, otherwise such oscillations could not build up in device 2. Since the bias current level is reflected in a voltage appearing across resistor 4, capacitor 5 couples an impulse coinciding with the front edge or start of oscillations in device 2 through capacitor 5, resistor 6, and pulse amplifier 7 to pulse generator 11. The diode clipper circuit 8, 9 confines the total excursion of the impulse with respect to ground potential in the conventional manner so as to protect amplifier 7 from over load. Since pulse generator 11 may also receive signals from other channel sources, diode 10 is provided to permit current flow from amplifier 7 only in the direction of generator 11. Pulse generator 11 produces a pulse preferably short enough to produce the desired radio spectrum width. Pulse generator 11, like many other conventional pulse generators, has a finite recovery time, preventing its regenerative operation. Therefore, it must await a newly received input pulse traversing capacitor 5 and pulse amplifier 7 before it is in condition to generate a succeeding output pulse.

The standardized pulse formed by pulse generator 11 is fed by electrical conductor 13 to junction 14, thus passing also to junction 17. Diode 15 permits flow of the pulse signal only in the direction from junction 14 toward junction 17, where the pulse is coupled by capacitor 5 to oscillator-detector device 2. The polarity of the pulse thus supplied is such as to aid the bias source 3 in causing oscillator-detector 2 again to break into high frequency oscillation, which oscillations are thereupon radiated by antenna 1 to be received by the open receivers of radar apparatus in the operating vicinity of the transponder and the vehicle upon which it is mounted. In conventional radar apparatus, the range and bearing of the vehicle carrying the transponder of the present invention is readily presented in a conventional manner on a type P or plan position cathode ray indicator.

Where individual transponder power output and band width characteristics so determine, multiple channels may be employed to enhance operation of the invention. The apparatus of the sole FIGURE illustrates the use of two similar channels, though three or more may be employed. In the second channel of the sole FIGURE, for instance, a second omnidirectional antenna 1a is employed, though its function may be combined with that of antenna 1. However, a second single-port oscillator-detector device 2a is used, designed to cover a frequency range usually adjacent that of oscillator-detector device 2. Device 2a is supplied with an operating bias potential via resistor 4a from the common bias source 3. Again, by virtue of resistor 4a, the bias level supplied to the diode of a single port oscillator-detector 2a is very nearly sufficient to cause oscillation within oscillator-detector 2a. The presence of received high frequency carrier energy in antenna 1a initiates such oscillation with the consequence that there is an abrupt increase in current supplied by bias source 3 to the oscillator-detector 2a.

A voltage corresponding to the instantaneous bias current appears across resistor 4a and any change in that bias current is coupled by capacitor 5a through limiting resistor 6a to amplifier 7a. The junction between resistor 6a and amplifier 7a is coupled to ground through a conventional dual diode (8a, 9a)

clipper circuit analogous to the clipper circuit including diodes 8, 9. Amplifier 7a thus produces an impulse output when carrier energy is received by antenna 1a and that output is supplied through diode 10a to the pulse generator 11. As previously noted, any pulse output developed by pulse generator 11 is coupled back by electrical conductor 13 to junction 14. In the second channel, junction 14 cooperates with a second series circuit now connected between junction 14 and junction 17a, which latter is the junction between coupling capacitor 5a and the current limiting resistor 6a. The series circuit between junctions 14 and 17a consists of diode 15a poled to conduct current flowing toward terminal 17a only, diode 17a being placed in series with resistor 16a.

Operation of the first and second described channels is similar. An incoming high frequency signal falling in the pass band of the oscillator-detector 2 causes the latter to oscillate and to provide a detected trigger pulse to the pulse generator 11. The latter is fed back via electrical conductor 13 and along the signal paths which branch at junction 14 respectively through coupling condensers 5, 5a, causing both of the oscillator-detectors 2, 2a to oscillate and to radiate high frequency energy from antennas 1, 1a. In a similar fashion, should the energy collected by the antennas fall only within the pass band of oscillator-detector 2a, both oscillator-detectors 2, 2a are again caused to transmit high frequency energy from antennas 1, 1a.

The use of two or more oscillator-detectors is unexpectedly advantageous, yielding improvement beyond that improvement which would normally be expected merely by doubling equipment, as will be explained. While the following discussion of the improvement yielded is regarded as useful in further explaining the invention, it is not the only analysis which might be used, and therefore is not offered in a restrictive sense.

The transponder of the present invention must have a transmitter that can be seen by a radar receiver tuned anywhere within a frequency band $\Delta F$. The quantity $\Delta F$ must be large enough to take into account all possible variations in the operating frequency of the radar system and of the transponder. If two transmitters are used in the transponder, the quantity $\Delta F$ for each is halved. Now, it is to be recognized that a radio frequency signal has a frequency spectrum whose main lobe is $2/T$ Hz wide, where T is the pulse width. Choosing a sufficiently narrow enough pulse, the pulse spectrum can be spread so that it will be received by any receiver operating in the band $\Delta F$. It is sufficient to observe that optimum results occur when $1/T = \Delta F$, and the minimum power density is then equal to $P/2\Delta F$, where P is the pulse power. This is the power density that must be adequate to be seen by a radar receiver. Since a pulse of this nature will in general be very much narrower than the rise time of the receiver, the amplitude of the receiver output will be reduced by approximately the ratio of the transponder's pulse width to the radar receiver's design pulse width. Consequently, the power density that must be produced at the radar receiver is also inversely proportional to the transponder's pulse width. Providing two transmitters, each of which covers half the frequency range $\Delta F$, permits use of an effectively doubled pulse width and reduces the peak transponder transmitter power required by a factor of four.

In general, for a given frequency coverage and for a given cooperating radar receiver, the peak power required of the transponder transmitter is proportional to $1/N^2$, where N is the number of transponder transmitters employed.

Operation of plural oscillator-detector devices, each with its associated signal processing channel, assures relatively higher power operation of the transponder device and thus permits more ready detection of the transponder by cooperating search radar systems. While a cooperating radar unit may have its operating carrier frequency centered in the pass band of one of the plural oscillator-detectors, the use of plural oscillator-detectors ensures that the total frequency band reserved for use in marine radar applications is covered by the transponder. Also assured is that a portion of the transmission from a transponder always falls in the receptivity band of all cooperating radar receivers. Accordingly, the invention responds essentially like an untuned transponder to any incoming signal within its composite band and transponds over the entire marine radar band, making its response ideal for use as a distress signalling device.

While the invention has been described in its preferred embodiment, it is to be understood that the words which have been used are words of description rather than of limitation and changes within the purview of the appended claims may be made without departure from the true scope and spirit of the invention in its broader aspects.

I claim:

1. Radio transponder apparatus comprising:
   oscillator-detector means,
   bias current supply means for continuously biasing said oscillator-detector means near its oscillating state,
   antenna means for coupling a pulsed high frequency energy transmission into said oscillator-detector means for causing onset of oscillations therein,
   means for detecting said onset of oscillations for producing a trigger pulse thereupon,
   means triggered into operation by said trigger pulse for producing a substantially standardized pulse, and
   means for coupling a version of said substantially standardized pulse to said oscillator-detector means for causing said oscillator-detector means to generate a pulsed high frequency signal for transmission out of said antenna means.

2. Apparatus as described in claim 1 wherein said oscillator-detector means comprises negative-resistance diode oscillator-detector means.

3. Apparatus as described in claim 1 wherein said oscillator-detector means comprises semiconductor diode oscillator-means having single port means adapted for connection to said antenna means.

4. Apparatus as described in claim 2 having means for supplying said bias current through said diode means.

5. Apparatus as described in claim 4 wherein said bias current supply means comprises bias source means coupled through impedance means to said diode means.

6. Apparatus as described in claim 5 wherein said means for detecting said onset of oscillations for producing a trigger pulse comprises circuit means including capacitive means for sensing voltage changes across said impedance means.

7. Apparatus as described in claim 6 wherein said circuit means comprises impedance means and amplifier means in series relation with said capacitive means.

8. Apparatus as described in claim 7 comprising diode clipper means coupled between said circuit means and ground for protecting said amplifier means.

9. Apparatus as described in claim 6 wherein said means for supplying a standardized pulse comprises single shot multivibrator means having an output unilaterally coupled to said capacitive means.

10. Radio transponder apparatus comprising:
first and second oscillator-detector means,
bias current supply means for biasing said oscillator-detector means near the respective oscillating states of said oscillator-detector means,
antenna means for coupling pulsed high frequency energy into at least one of said first and second oscillator-detector means for causing onset of oscillations therein,
means for detecting said onset of oscillations within said oscillator-detector means for producing a trigger pulse thereupon,
means, triggered into operation upon receiving said trigger pulse for producing a substantially standard pulse, and
means for coupling a version of said substantially standard pulse to said first and second oscillator-detector means for causing onset of oscillations in both of said first and second oscillator-detector means for transmission of high frequency energy from antenna means.

11. Apparatus as described in claim 10 wherein:
said first and second oscillator-detector means are characterized by respective first and second non-overlapping operational frequency bands.

* * * * *